United States Patent
Shibata et al.

(10) Patent No.: US 7,613,370 B2
(45) Date of Patent: Nov. 3, 2009

(54) OPTICAL SWITCH AND METHOD OF ADJUSTING OPTICAL SWITCH

(75) Inventors: Kohei Shibata, Kawasaki (JP);
Hirofumi Aota, Kawasaki (JP);
Tamotsu Akashi, Kawasaki (JP);
Toshiya Kishida, Kawasaki (JP);
Hiroyuki Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/074,060

(22) Filed: Feb. 29, 2008

(65) Prior Publication Data

US 2008/0240650 A1 Oct. 2, 2008

(30) Foreign Application Priority Data

Mar. 28, 2007 (JP) .............................. 2007-085453

(51) Int. Cl.
*G02B 6/35* (2006.01)
(52) U.S. Cl. .......................................... 385/18; 385/24
(58) Field of Classification Search .................. 385/18, 385/24

See application file for complete search history.

(56) References Cited

U.S. PATENT DOCUMENTS

| 6,983,089 | B2 * | 1/2006 | Takushima et al. ............. 385/24 |
| 2005/0141807 | A1 * | 6/2005 | Takushima et al. ............. 385/24 |
| 2006/0093256 | A1 | 5/2006 | Yamashita et al. |
| 2006/0093258 | A1 | 5/2006 | Terahara et al. |
| 2006/0239608 | A1 | 10/2006 | Akashi |

FOREIGN PATENT DOCUMENTS

| JP | 2005-285294 | 10/2005 |
| JP | 2006-058682 | 3/2006 |
| JP | 2006-126561 | 5/2006 |
| JP | 2006-133336 | 5/2006 |
| JP | 2006-276216 | 10/2006 |

OTHER PUBLICATIONS

"Effect of Mirror curvature in MEMS micro-mirror based wavelength-selective switches" by Dan M. Marom, David T. Neilson, Roland Ryf, and Herbert R. Shea.
Japanese Office Action issued on Feb. 19, 2009 corresponding Japanese Patent Application 2007-085453.

* cited by examiner

*Primary Examiner*—Sarah Song
(74) *Attorney, Agent, or Firm*—Staas & Halsey LLP

(57) ABSTRACT

An optical switch includes an input port into which a multiplexed optical signal is input; a dispersing unit that, according to wavelength, disperses the multiplexed optical signal into a plurality of optical signals that are each dispersed in a unique direction; a converging unit that converges the dispersed optical signals; plural mirrors that are arrayed forming a single row in a plane and reflecting the converged optical signals, respectively; and plural output ports through which the reflected optical signals are output. Each of the mirrors has a concave reflective surface that is in the plane and of a predetermined curvature about an axis parallel to the plane.

11 Claims, 18 Drawing Sheets

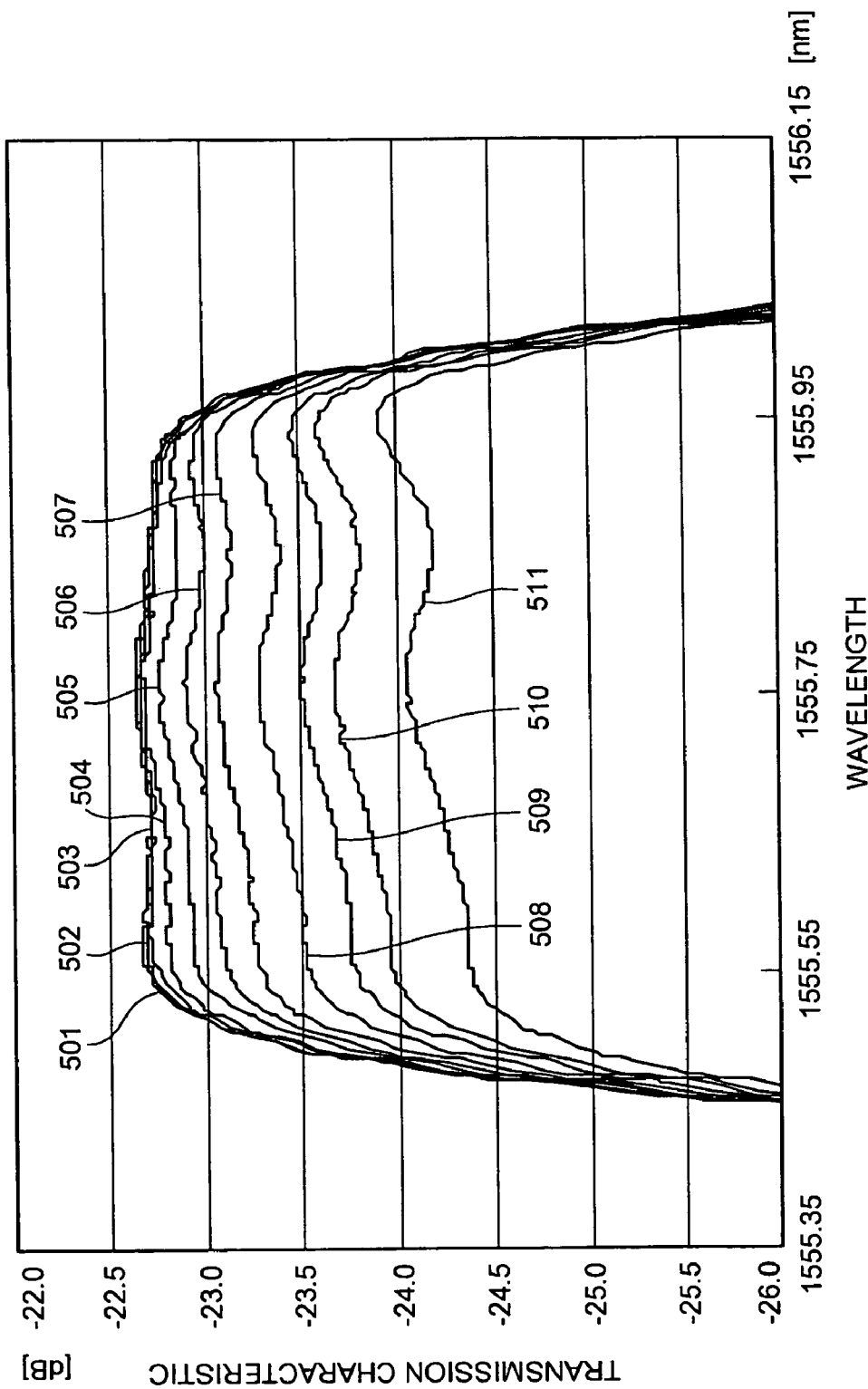

OPTICAL SWITCH AND METHOD OF ADJUSTING OPTICAL SWITCH

CROSS-REFERENCE TO RELATED APPLICATIONS

This application is based upon and claims the benefit of priority from the prior Japanese Patent Application No. 2007-085453, filed on Mar. 28, 2007, the entire contents of which are incorporated herein by reference.

BACKGROUND OF THE INVENTION

1. Field of the Invention

The present invention relates to a technology of an optical switch.

2. Description of the Related Art

Conventionally, a primary object of wavelength division multiplexing (WDM) in an optical transmission system is to achieve higher transmission capacity by increasing the number of channels. Recently, higher added value and lower operational costs of optical transmission systems have been expected from increased service menus using wavelength differences, and flexible band utilization.

However, conventional methods involving optical-to-electronic conversion of an optical signal followed by electronic switching and electronic-to-optical conversion, do not effect higher transmission capacity and lower operational costs. Hence, there is a need for a device that includes plural optical input and output ports, and that selectively manipulates an input multiplexed optical signal without electronic conversion. Included among such devices is an optical switch that, according to wavelength, selectively outputs optical signals included in the multiplexed optical-signal to different output ports respectively corresponding to the wavelengths, (see, for example, Marom, Dan M., et. al. "Effect of Mirror Curvature in MEMS Micro-mirror Based wavelength-selective Switches").

FIG. 17 is a schematic of a conventional optical switch. A conventional optical switch 1700 includes a port unit 1710, a collimating lens unit 1720, a lens system 1730, a dispersing element 1740, a converging lens 1750, and a mirror unit 1760.

The port unit 1710 includes plural ports 1711 to 1715. The port 1711 is an input port through which an optical signal is input to the optical switch 1700. The optical signal exits the port 1711 diverging and is output to a collimating lens 1721 included in the collimating lens unit 1720. The input optical signal is a multiplexed optical signal including plural wavelengths corresponding to different channels.

The collimating lens unit 1720 includes plural collimating lenses 1721 to 1725. The collimating lens 1721 collimates the diverged optical signal output from the port 1711 and outputs the collimated optical signal to the lens system 1730. The port unit 1710 and the collimating lens unit 1720 are arranged along the Z-axis.

The lens system 1730 spatially separates channels, i.e., wavelengths, of the collimated optical signal output from the collimating lens 1721 and outputs the resulting optical signal to the dispersing element 1740. The lens system 1730 includes a concave lens 1731 and a convex lens 1732. The concave lens 1731 diverges and outputs, to the convex lens 1732, the collimated optical signal output from the collimating lens 1721. The convex lens 1732 collimates and outputs, to the dispersing element 1740, the diverged optical signal output from the concave lens 1731.

The dispersing element 1740 angularly disperses the optical signal, output from the lens system 1730, about the X-axis in different directions corresponding to wavelength while outputting the optical signals in the direction of the Y-axis to the converging lens 1750. The dispersing element 1740 includes a transmissive diffraction grating.

The converging lens (converging optical system) 1750 converges, onto corresponding mirrors included in the mirror unit 1760 and according to wavelength, the optical signals output from the dispersing element 1740. Also, according to wavelength, the optical signals pass through different positions on the converging lens 1750.

The mirror unit 1760 includes plural mirrors arrayed along the X-axis. The mirrors correspond to the different wavelengths, respectively. For example, mirrors 1761, 1762 and 1763 correspond to wavelengths $\lambda 1$, $\lambda 20$, and $\lambda 40$, respectively.

Each of the mirrors 1761 to 1763 respectively reflects an optical signal having a wavelength corresponding thereto. The reflected optical signals are among the converged optical signals output from the converging lens 1750 and reflected toward the converging lens 1750. The mirror unit 1760 includes a control unit that controls the reflection angle of each of the mirrors by rotating each mirror about the X-axis (a first rotation axis).

The reflected optical signals pass through the converging lens 1750, the dispersing element 1740, and the lens system 1730 to be output to the collimating lens unit 1720. The collimating lenses 1722 to 1725 correspond to the reflection angles of the mirrors 1761 to 1763 of the mirror unit 1760, and are arrayed along the Z-axis. The collimating lenses 1722 to 1725 output the received optical signals to ports 1712 to 1715 included in the port unit 1710.

The ports 1712 to 1715 are output ports corresponding respectively to the collimating lenses 1722 to 1725. The ports 1712 to 1715 receive the collimated optical signals output from the collimating lenses 1722 to 1725 and output the optical signals from the optical switch 1700.

According to the above configuration, the control unit changes the reflection angle of the mirrors according to the wavelength corresponding thereto. Thus, according to each optical wavelength included in the input optical signal, the optical switch 1700 selects, from among the ports 1712 to 1715, a port to output the optical signal.

Furthermore, the optical switch 1700 slightly changes the reflection angles of the mirrors from the optimal angles for coupling the reflected optical signals to the ports 1712 to 1715 to decrease the coupling rate. Thus, the optical switch 1700 attenuates, by an arbitrary level, the optical signals output from the ports 1712 to 1715 by rotating the mirrors about the X-axis.

However, the optical switch 1700 above has a problem in that since optical signals of different wavelengths respectively pass through different positions on the converging lens 1750, an optical signal passing through a position away from the center of the converging lens 1750 is likely to be affected by aberration of the converging lens 1750. In particular, when many wavelengths are used in WDM transmission, the effective area of the converging lens 1750 becomes larger, increasing the effect of the aberration of the converging lens 1750.

FIG. 18A is a graph indicating a transmission band characteristic of the conventional optical switch. FIG. 18B is a graph indicating a short-wavelength-side transmission band characteristic of the conventional optical switch. FIG. 18C is a graph indicating a long-wavelength-side transmission band characteristic of the conventional optical switch. The horizontal axis indicates a wavelength (channel), and the vertical axis indicates a transmissivity (decibel (dB)).

A reference numeral 1801 indicates a range of wavelengths used in the WDM transmission. A reference numeral 1802 indicates a transmission band characteristic of the optical switch 1700 when an attenuation level is set to 0 dB by decreasing the coupling rate of the port unit 1710. A reference numeral 1803 indicates the transmission band characteristic when the attenuation level is set to 20 dB. An optical signal corresponding to a channel 20 passes a point closest to the center of the converging lens 1750.

As shown in the FIGS. 18A to 18C, the transmissivity becomes highest at the channel 20. The farther away a channel is from the channel 20, the lower the transmissivity becomes due to the effect of aberration, causing a slope of the transmission band characteristic for each channel. The slope becomes steeper when the attenuation level is 20 dB than when the attenuation level is 0 dB.

The slope reduces the communication band. In particular, when the output optical signal is attenuated by decreasing the coupling rate of the port unit 1710, the slope becomes steeper, causing a large reduction of the communication band. Furthermore, the use of plural compensating lenses to correct the aberration of the converging lens 1750 means increased components, resulting in reduced long-term reliability and increased element costs.

SUMMARY OF THE INVENTION

It is an object of the present invention to at least solve the above problems in the conventional technologies.

An optical switch according to one aspect of the present invention includes a dispersing unit that disperses an input multiplexed optical signal into a plurality of optical signals according to wavelength, and a plurality of mirrors that reflect and selectively output the optical signals to a plurality of output ports, respectively. Each of the mirrors has a concave reflective surface having a predetermined curvature about an axis parallel to a plane in which the concave reflective surfaces are arrayed.

An optical switch according to another aspect of the present invention includes an input port to which a multiplexed optical signal is input; a dispersing unit that, according to wavelength, disperses the multiplexed optical signal into a plurality of optical signals that are each dispersed in a unique direction; a converging unit that converges the dispersed optical signals; a plurality of mirrors arrayed forming a single row in a plane and reflecting the converged optical signals, respectively; and a plurality of output ports through which the reflected optical signals are output. Each of the mirrors has a concave reflective surface that is in the plane and of a predetermined curvature about a first axis parallel to the plane.

A method according to still another aspect of the present invention is a method of adjusting an optical switch that includes a dispersing unit that disperses an input multiplexed optical signal into a plurality of optical signals according to wavelength, and a plurality of mirrors that reflect and selectively output the optical signals to a plurality of output ports, respectively, in which each of the mirrors has a concave reflective surface having a predetermined curvature about an axis parallel to a plane in which the concave reflective surfaces are arrayed. The method includes first-adjusting the predetermined curvature and a first reflection angle of each of the mirrors about the axis; and second-adjusting a second reflection angle of each of the mirrors for switching between the output ports.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a graph indicating a transmission band characteristic of a mirror for each rotation angle;

DETAILED DESCRIPTION OF THE PREFERRED EMBODIMENTS

Referring to the accompanying drawings, exemplary embodiments according to the present invention are explained in detail below.

Figure 1:
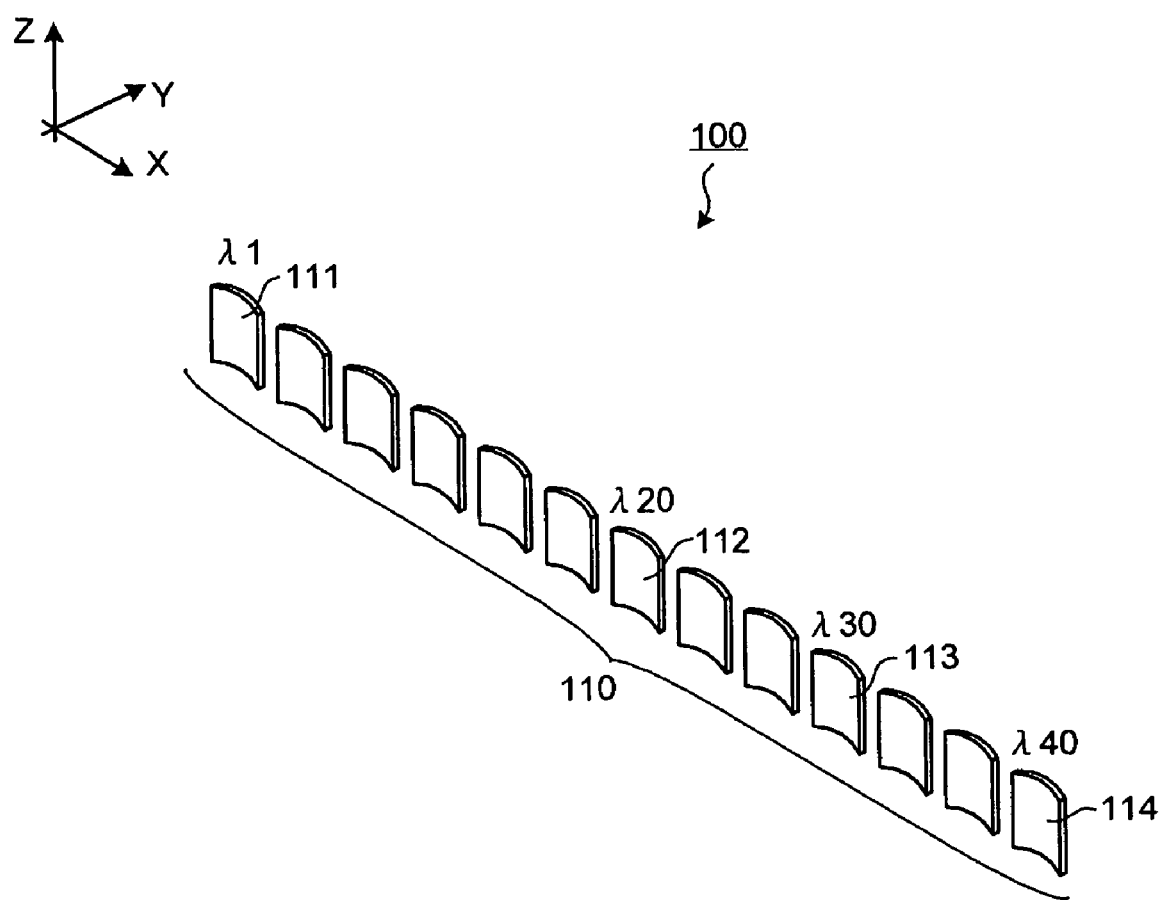
FIG. 1 is a schematic of a mirror unit of an optical switch according to an embodiment.

FIG. 1 is a schematic of a mirror unit of an optical switch according to an embodiment. Since configuration of the optical switch according to the embodiment is the same as that of the conventional optical switch 1700 except for a mirror unit, only the mirror unit is shown and other parts are omitted. The same reference numbers identify identical elements. An optical switch 100 according to the embodiment includes a mirror unit 110 instead of the mirror unit 1760 of the optical switch 1700.

The mirror unit 110 includes plural mirrors arrayed and housed in a case (not shown). The case includes a driving unit (not shown) that moves the mirrors, and a control unit (not shown) that controls the driving unit. The mirrors are arrayed along the X-axis and respectively correspond to the wavelengths of the multiplexed optical signal.

For example, mirrors 111, 112, 113, and 114 respectively correspond to wavelengths $\lambda 1$ (channel 1), $\lambda 20$ (channel 2), $\lambda 30$ (channel 30), and $\lambda 40$ (channel 40). Each reflective surface of the mirrors is concave and has a predetermined curvature about an axis parallel to the plane in which the reflecting surface lies (a Z-axis).

The control unit controls the driving unit to rotate the each mirror about the X-axis to switch the output port to which a received optical signal is reflected, and about the Z-axis to change the reflection angle in the angular dispersion direction (the X-axis direction).

The reflection angle, in the X-axis direction, of each mirror varies depending on the position on the converging lens 1750 through which a corresponding optical signal passes. For example, the reflection angle becomes larger as the distance between the position and the center of the converging lens 1750 becomes larger.

Figure 2A:
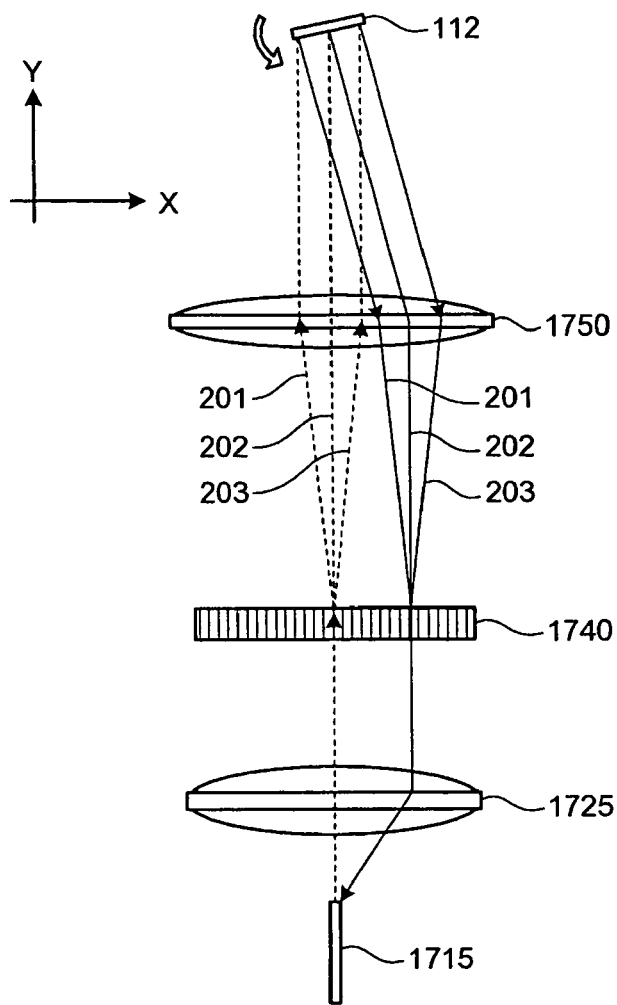
FIG. 2A is a first schematic for explaining a principle of the optical switch.
Figure 2B:
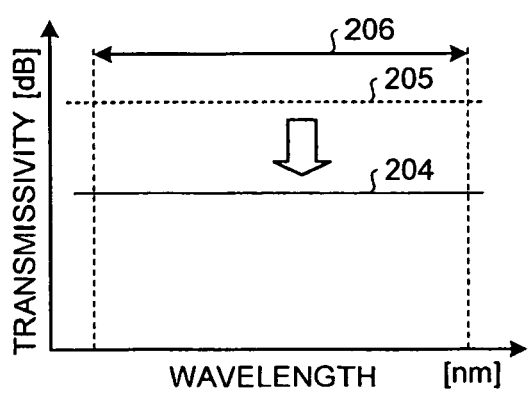
FIG. 2B is a graph indicating a transmission band characteristic of the optical switch shown in FIG. 2A.

FIG. 2A is a first schematic for explaining a principle of the optical switch 100. FIG. 2B is a graph indicating a transmission band characteristic of the optical switch 100 shown in FIG. 2A. Only one of the channels (channel 20 herein) is shown in FIGS. 2A and 2B (and also in FIGS. 3A to 4B and 9A to 11B).

It is assumed that the converging lens 1750 shown in FIG. 2A (also in FIGS. 3A, 4A, 9A, 10A, 11A, 12A, and 13A) is an ideal lens having no aberration and that the reflected optical signal is output to the port 1715. A reference numeral 206 shown in FIG. 2B (also in FIGS. 3B and 4B) indicates a range of wavelengths of the channel 20.

A reference numeral 204 shown in FIG. 2B indicates a transmission band characteristic when the reflective surface of a mirror 112 has no curvature and the mirror 112 is rotated about the Z-axis. A reference numeral 205 indicates a transmission band characteristic when the reflective surface is flat and the mirror 112 is not rotated about the Z-axis.

FIG. 2A shows a configuration of the optical switch 100 when the reflective surface has no curvature and the mirror 112 is rotated about the Z-axis. In this case, an optical signal 201 having a short wavelength, an optical signal 202 having a center wavelength, and an optical signal 203 having a long wavelength are reflected in parallel with one another and converged to one point on the dispersing unit 1740 by the converging lens 1750.

As a result, the optical signals 201, 202, and 203 are input to the port 1715 by the collimating lens 1725 at an identical angle. In this case as shown in FIG. 2B, a transmissivity of each wavelength included in the channel 20 is equally decreased when comparing the transmission band characteristics 204 and 205.

Figure 3A:
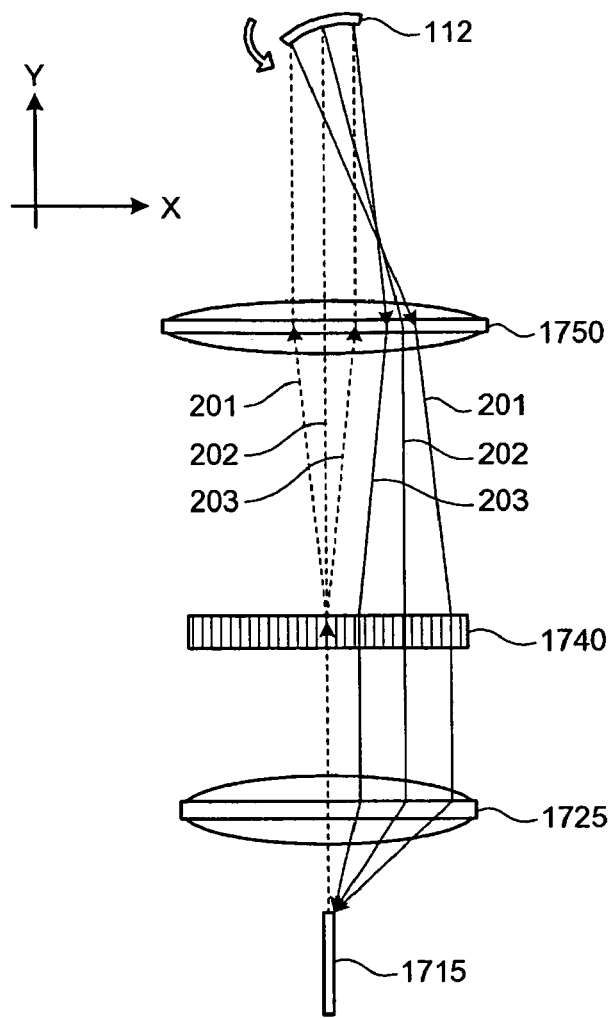
FIG. 3A is a second schematic for explaining the principle.
Figure 3B:
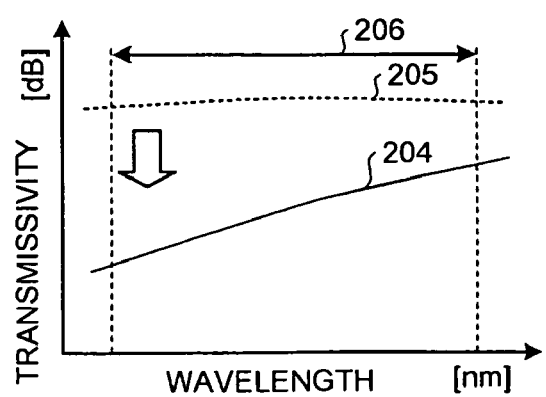
FIG. 3B is a graph indicating a transmission band characteristic of the optical switch shown in FIG. 3A.

FIG. 3A is a second schematic for explaining the principle. FIG. 3B is a graph indicating a transmission band characteristic of the optical switch 100 shown in FIG. 3A. FIG. 3A shows a configuration of the optical switch 100 when the reflective surface of the mirror 112 is curved and the mirror 112 is rotated about the Z-axis.

In this case, the optical signals 201, 202, and 203 are reflected by the mirror 112 at respectively different angles. After being reflected by the mirror 112, the optical signal 201 is converged, by the converging lens 1750, to a point away from the center of the dispersing unit 1740.

After being reflected by the mirror 112, the optical signal 203 is converged, by the converging lens 1750, to a point close to the center of the dispersing unit 1740. As a result, the optical signal 201 is input to the port 1715 at a large angle by the collimating lens 1725. On the other hand, the optical signal 203 is input to the port 1715 at a small angle by the collimating lens 1725.

In this case as shown in FIG. 3B, a transmissivity of the optical signal 201 greatly decreases in the transmission band characteristic 204 compared with the transmission band characteristic 205. On the other hand, a transmissivity of the optical signal 203 decreases less than that of the optical signal 201. As a result, the transmission band characteristic 205 can be compensated using the compensation level of the transmission band characteristic 204 in which the transmissivity increases as the wavelength of the channel 20 becomes longer.

Figure 4A:
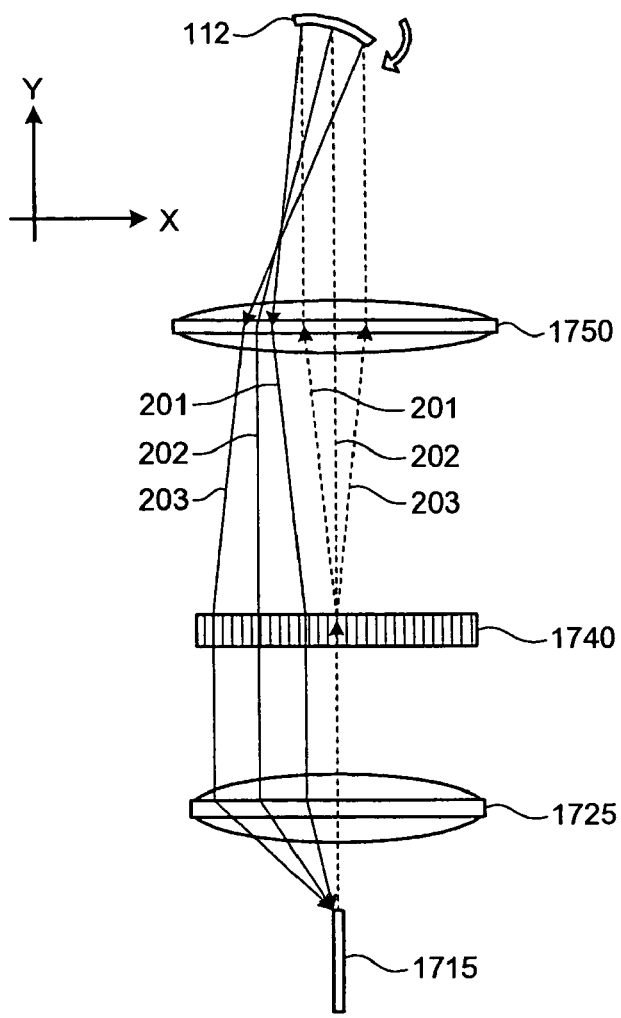
FIG. 4A is a third schematic for explaining the principle.
Figure 4B:
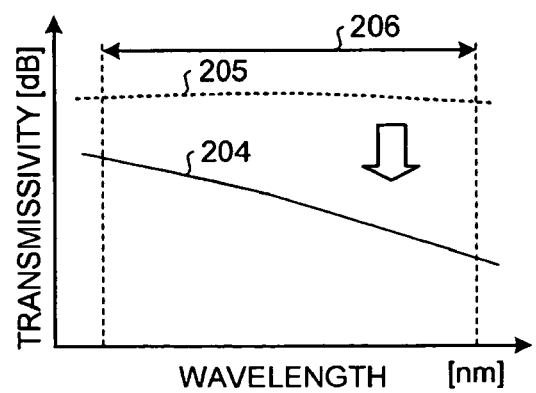
FIG. 4B is a graph indicating a transmission band characteristic of the optical switch shown in FIG. 4A.

FIG. 4A is a third schematic for explaining the principle. FIG. 4B is a graph indicating a transmission band characteristic of the optical switch 100 shown in FIG. 4A. FIG. 4A indicates a configuration of the optical switch 100 when the reflective surface of the mirror 112 is curved and the mirror 112 is rotated about the Z-axis in a direction opposite to that in the case of FIG. 3A.

In this case, the optical signals 201, 202, and 203 are reflected by the mirror 112 at respectively different angles. After being reflected by the mirror 112, the optical signal 201 is collected, by the converging lens 1750, to a point close to the center of the dispersing unit 1740.

After being reflected by the mirror 112, the optical signal 203 is collected, by the converging lens 1750, to a point far from the center of the dispersing unit 1740. As a result, the optical signal 201 is input to the port 1715 at a small angle by the collimating lens 1725. On the other hand, the optical signal 203 is input to the port 1715 at a large angle by the collimating lens 1725.

In this case as shown in FIG. 4B, the transmissivity of the optical signal 203 greatly decreases in the transmission band characteristic 204 compared with the transmission band characteristic 205. On the other hand, a transmissivity of the optical signal 201 decreases less than that of the optical signal 203. As a result, the transmission band characteristic 205 can be compensated using a compensation level of the transmission band characteristic 204 in which the transmissivity decreases as the wavelength of the channel 20 becomes longer.

As shown in FIGS. 2A to 4B, a concave reflective surface of the mirror 112 and rotation of the mirror 112 about the Z-axis enables the optical switch 100 to compensate the transmission band characteristic of each channel using a compensation level corresponding to each channel.

Thus, the optical switch 100 compensates the slope of the transmission band characteristic of each channel caused by the aberration of the converging lens 1750. When beam radii in both directions of the X-axis and the Z-axis of an optical signal passing through the optical switch 100 are identical, a coupling rate η of the output port unit 1710 can be calculated as follows.

$$\eta(\Delta\lambda) \approx \exp\left(-\frac{\omega_0^2 \pi^2}{(\lambda_0 + \Delta\lambda)^2}\left(\theta + \frac{\alpha}{R}\Delta\lambda\right)^2\right) \quad (1)$$

$\lambda_0$ indicates each center wavelength of an optical signal reflected by each mirror. $\Delta\lambda$ indicates a difference between a wavelength of an optical signal and the center wavelength. $\omega_0$ indicates a beam spot size of an optical signal when reflected by each mirror. θ indicates a rotation angle when the mirror is rotated about the X-axis. R indicates a curvature radius of each mirror. α indicates a constant of the optical system forming the optical switch 100.

FIG. 5 is a graph indicating a transmission band characteristic according to the rotation angle of a mirror. The transmission band characteristics of channels of which wavelengths are within the range of 1555.55 nanometer (nm) to 1555.90 nm are shown. Reference numerals 501 to 511 indicate transmission band characteristics respectively corresponding to the rotation angles of 0 degrees, 0.024 degrees, 0.048 degrees, 0.072 degrees, 0.096 degrees, 0.12 degrees, 0.144 degrees, 0.168 degrees, 0.192 degrees, 0.216 degrees, and 0.24 degrees.

As shown in FIG. 5, transmissivity of each wavelength included in the channel 20 becomes substantially constant when the slope of the transmission band characteristics for each channel caused by the aberration of the converging lens 1750 is compensated by the optical switch 100. Further, the transmissivity of each channel overall decreases as the rotation angle increases.

Figure 6:
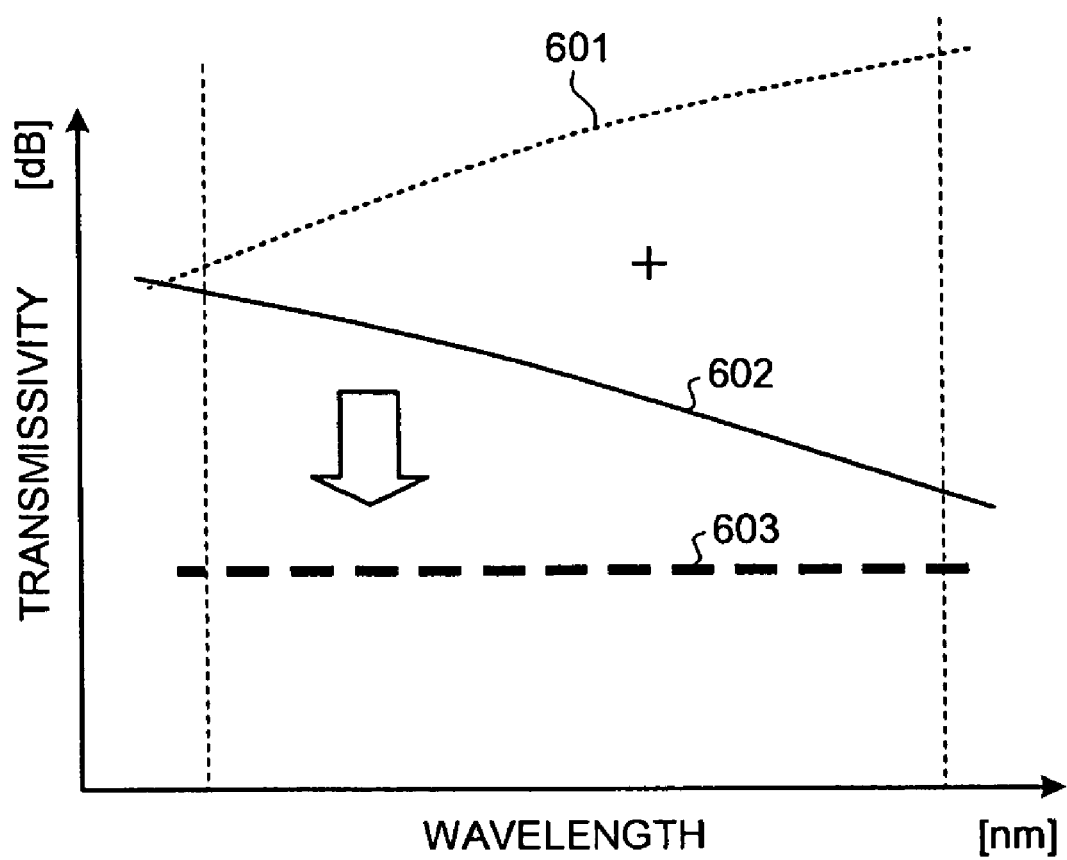
FIG. 6 is a schematic illustrating an adjusting procedure 1 of the optical switch.

FIG. 6 is a schematic illustrating an adjusting procedure 1 of setting the compensation level for a Ch. 1 of the optical switch 100. A reference numeral 601 indicates a transmission band characteristic when the reflective surface of the mirror 111 is flat, and the mirror 111 is not rotated about the Z-axis. A reference numeral 602 indicates a transmission band characteristic indicative of a compensation level when the mirror 111 is curved and rotated about the Z-axis.

The transmission band characteristic 601 of the channel 1 illustrates that transmissivity increases as wavelength increases. On the other hand, when the mirror 111 is rotated about the Z-axis as shown in FIG. 4A, the transmission band characteristic of the channel 1 can be compensated using a compensation level of a transmission band characteristic in which a transmissivity decreases as a wavelength increases as shown in FIG. 4B. As a result, a transmission band characteristic of the channel 1 becomes constant such as a transmission band characteristic 603, and the slope of the transmission band characteristic can be compensated.

Figure 18A:
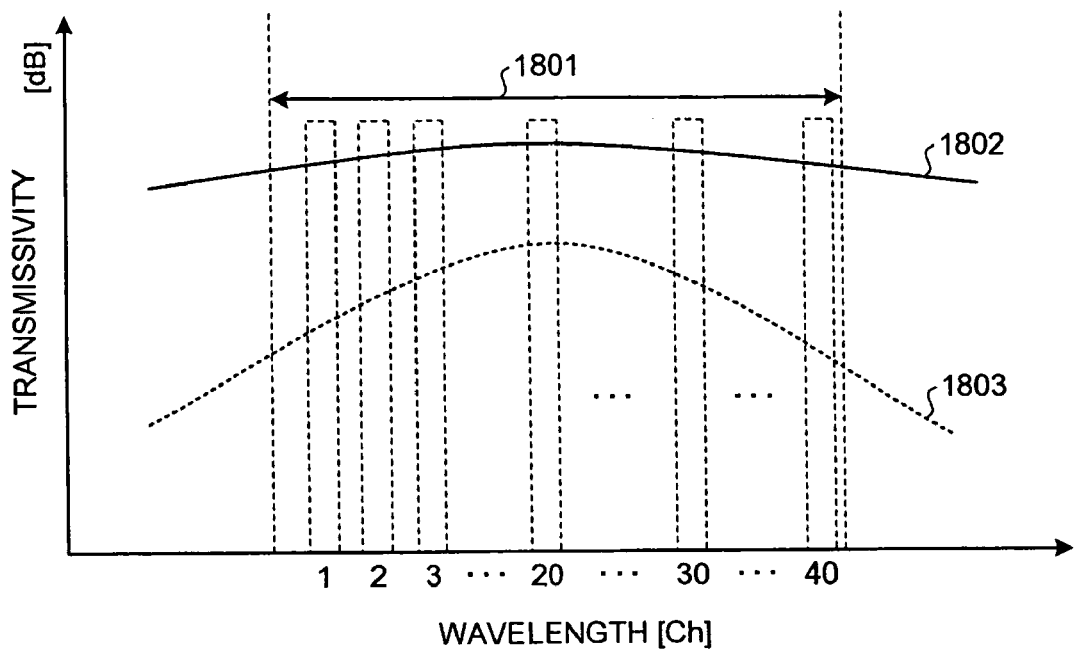
FIG. 18A is a graph indicating a transmission band characteristic of the conventional optical switch.
Figure 18B:
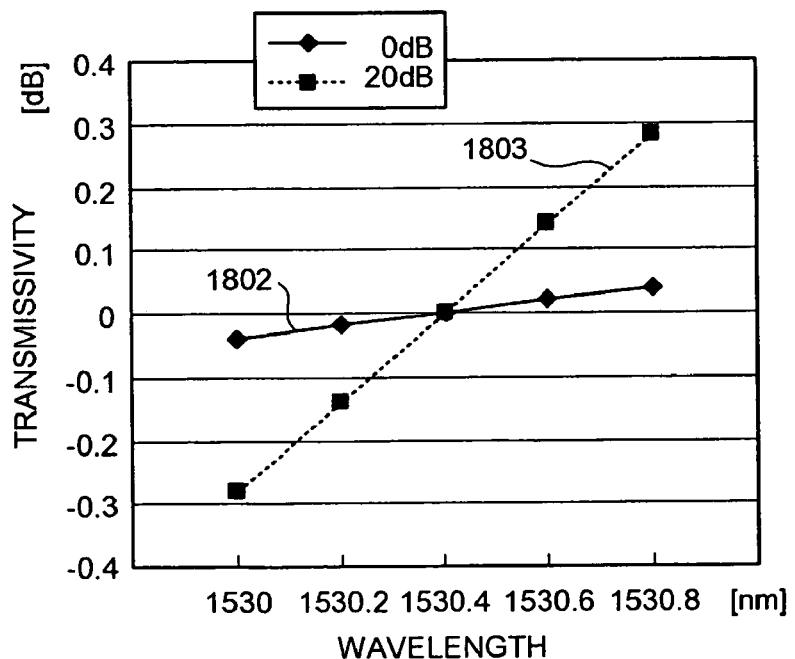
FIG. 18B is a graph indicating a shorter-wavelength-side transmission band characteristic of the conventional optical switch.
Figure 18C:
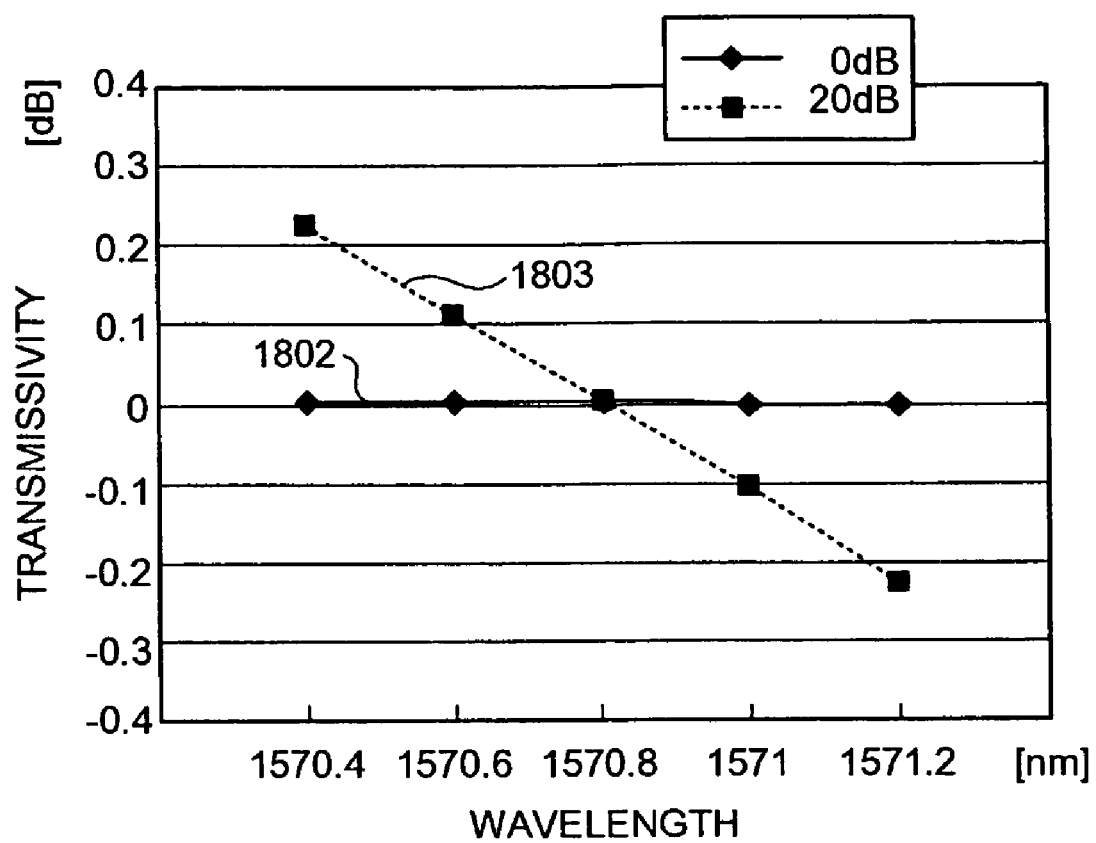
FIG. 18C is a graph indicating a longer-wavelength-side transmission band characteristic of the conventional optical switch.

For example, the transmission band characteristic of a channel 40 shown in FIG. 18A can be compensated using a compensation level of the transmission band characteristic in which transmissivity increases as wavelength increases as shown in FIG. 3B since the transmissivity of the channel 40 decreases as wavelength increases. As a result, a transmission band characteristic of the channel 40 becomes constant such as the transmission band characteristic 603, and the slope of the transmission band characteristic can be compensated.

Figure 7:
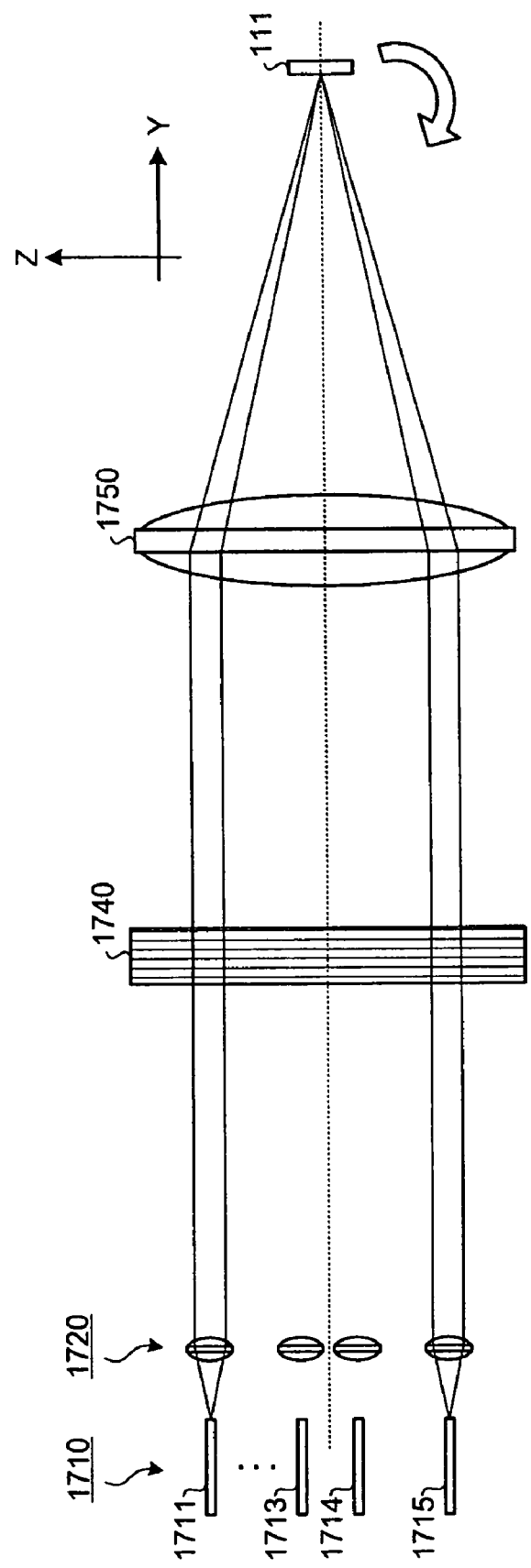
FIG. 7 is a first schematic illustrating an adjusting procedure 2 of the optical switch.
Figure 8:
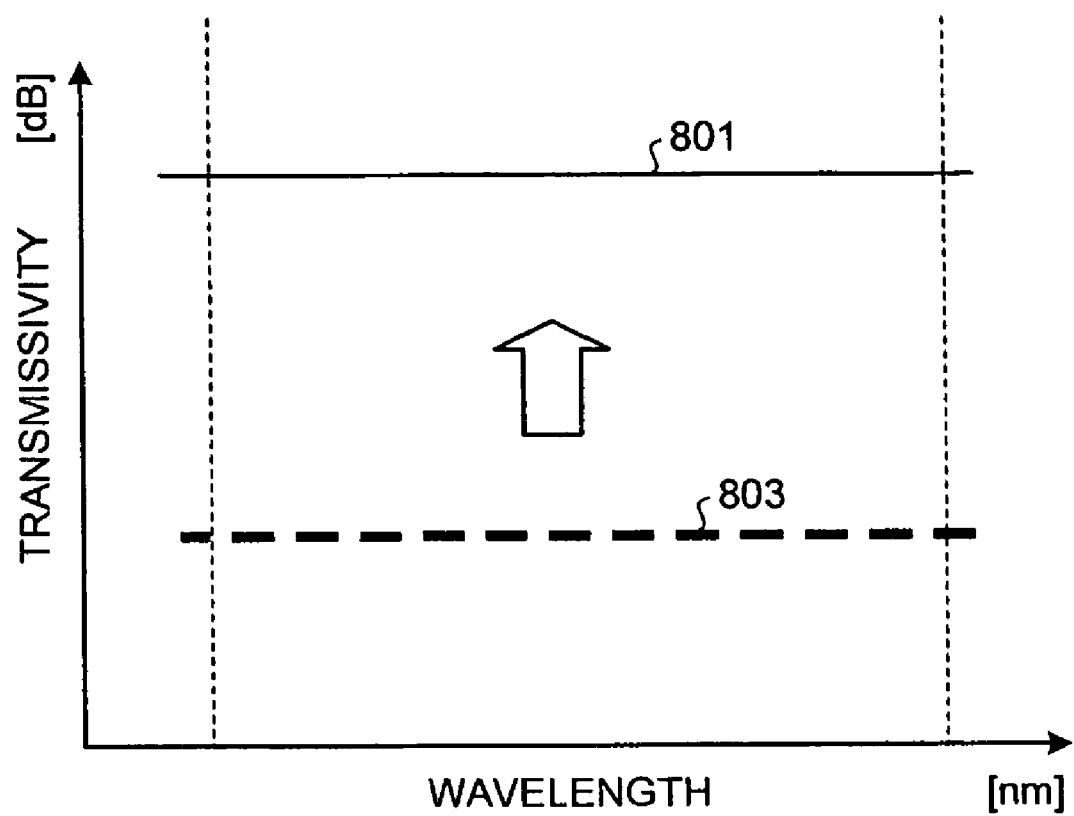
FIG. 8 is a second schematic illustrating the adjusting procedure 2 of the optical switch.

FIG. 7 is a first schematic illustrating an adjusting procedure 2 of the optical switch 100. FIG. 8 is a second schematic illustrating the adjusting procedure 2. When the optical switch 100 attenuates an optical signal output from the port 1715 by slightly changing the reflection angle of the mirror 111 from the optimal angle and decreasing a coupling rate of the port 1715, the optical switch 100 adjusts overall transmissivity of the channel 1 by changing the attenuation level after making the transmissivity of the channel 1 constant as shown in FIG. 6.

More specifically, the coupling rate of the port 1715 is increased by rotating the mirror 111 about the X-axis and slightly changing the reflection angle of the mirror 111 as shown in FIG. 7. As a result, the transmissivity of the transmission band characteristic 603 that has decreased overall by the adjusting procedure 1 shown in FIG. 6 can be increased overall as shown in FIG. 7.

The transmissivity decreased by the adjusting procedure 1 varies depending on the curvature of the mirror 111 about the Z-axis, the reflection angle of the mirror 111 in the X-axis direction, or a combination thereof. Therefore, the rotation angle of the mirror 111 to increase the transmissivity differs according to the curvature, the reflection angle in the X-axis direction, or the combination thereof.

According to the embodiment, the optical switch 100 can compensate, using the adjusting procedure 1, a slope of a transmission band characteristic caused by the aberration of the converging lens 1750 without a compensating lens.

Furthermore, the transmissivity for each channel that has been decreased by the adjusting procedure is adjusted to become a desired transmissivity using the adjusting procedure 2 shown in FIGS. 7 and 8. Therefore, the slope can be compensated for each channel, and the required transmissivity can be maintained at the same time.

Figure 9A:
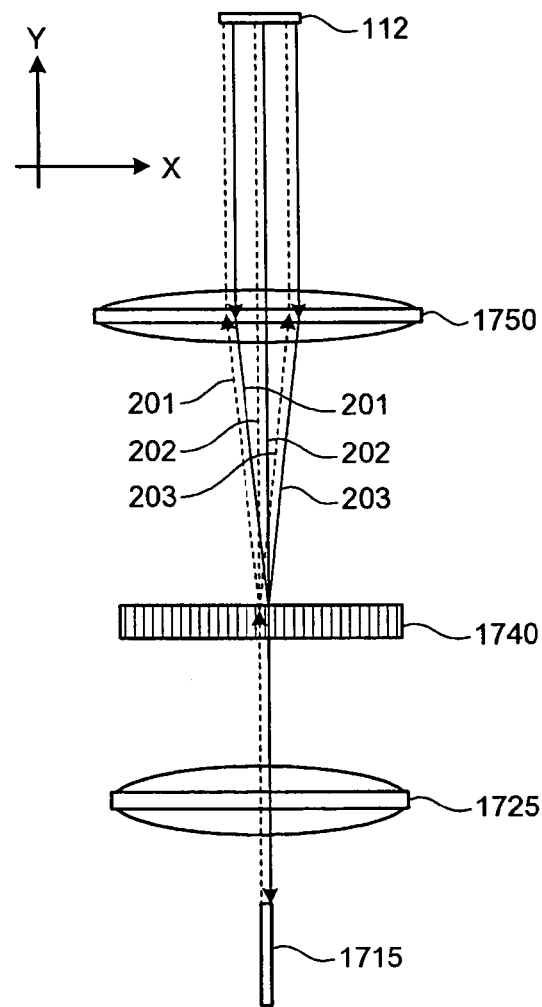
FIG. 9A is a schematic illustrating a curvature setting of a mirror of the optical switch when the curvature is zero.
Figure 9B:
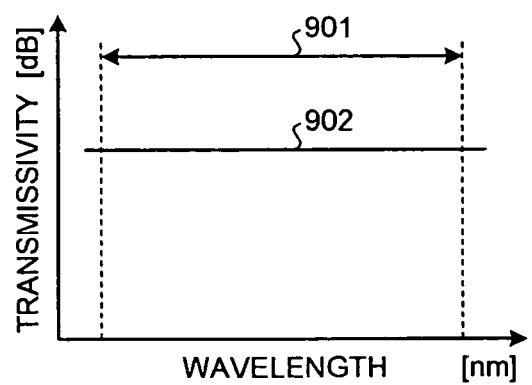
FIG. 9B is a graph indicating a transmission band characteristic of the optical switch shown in FIG. 9A.

FIG. 9A is a schematic illustrating curvature setting of the mirror 112 of the optical switch 100 when the curvature is zero. FIG. 9B is a graph indicating a transmission band characteristic of the optical switch 100 shown in FIG. 9A. FIG. 9A shows a configuration of the optical switch 100 when the reflective surface of the mirror 112 is flat and the mirror 112 is not rotated about the Z-axis. A reference numeral 901 shown in FIG. 9B (and also FIGS. 10B and 11B) indicates a range of wavelengths within which transmissivity of the channel 20 becomes equal to or greater than 0.5 dB.

In this case, the optical signals 201, 202, and 203 of the channel 20 are reflected by the mirror 112 in parallel to one another, and collected to one point on the dispersing unit 1740 by the converging lens 1750. As a result, the optical signals 201, 202, and 203 are input, by the collimating lens 1725, to the port 1715 at an angle for an optimal coupling state.

In this case, coupling loss does not occur for all of the wavelengths in the channel 20. Therefore, a transmission band characteristic 902 of the channel 20 indicates that a transmissivity of each wavelength in the channel 20 becomes constant.

Figure 10A:
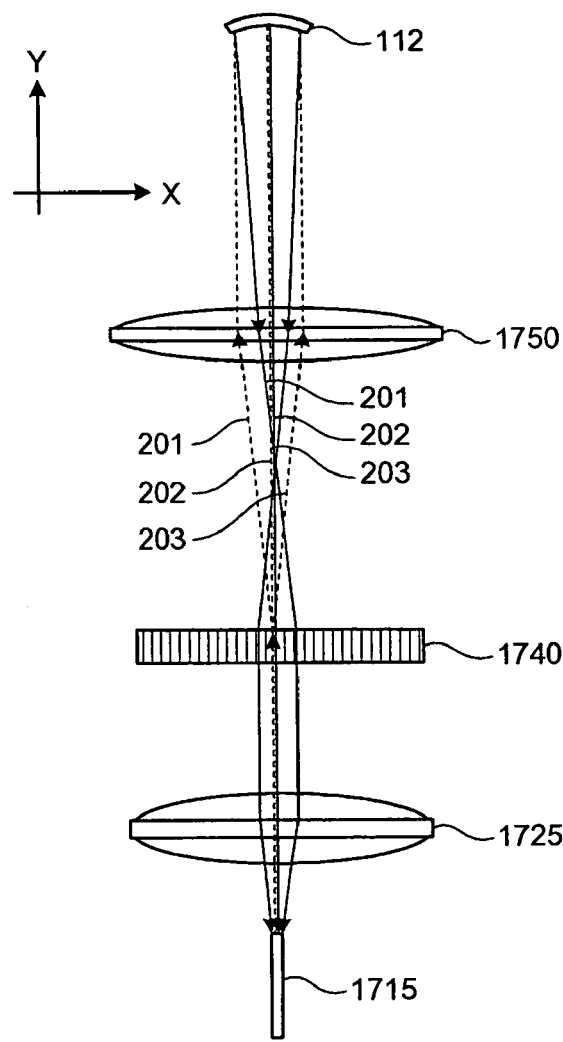
FIG. 10A is a schematic illustrating the curvature setting when a curvature radius is large.
Figure 10B:
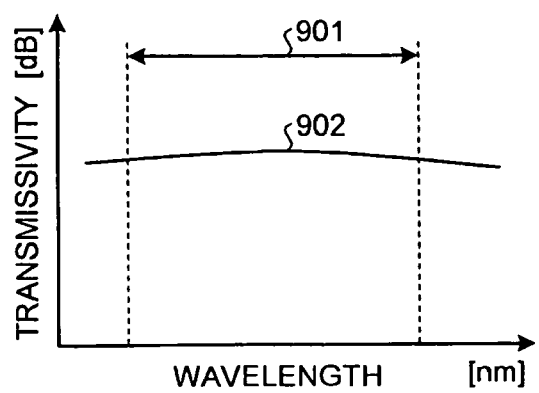
FIG. 10B is a graph indicating a transmission band characteristic of the optical switch shown in FIG. 10A.

FIG. 10A is a schematic illustrating curvature setting when the curvature radius is large. FIG. 10B is a graph indicating a transmission band characteristic of the optical switch 100 shown in FIG. 10A. FIG. 10A shows a configuration of the optical switch 100 when the curvature radius of the reflective surface of the mirror 112 is large, and the mirror 112 is not rotated.

In this case, as shown in FIG. 10A, the optical signals 201, 202, and 203 of the channel 20 are reflected by the mirror 112 at different angles, and collected to different points on the dispersing unit 1740 by the converging lens 1750, respectively. As a result, the optical signals 201, 202, and 203 are input to the port 1715 at different angles by the collimating lens 1725, respectively.

Since coupling loss occurs for the optical signals 201 and 203, the range 901 within which transmissivity is equal to or greater than 0.5 dB becomes narrower than the range 901 shown in FIG. 9B.

Figure 11A:
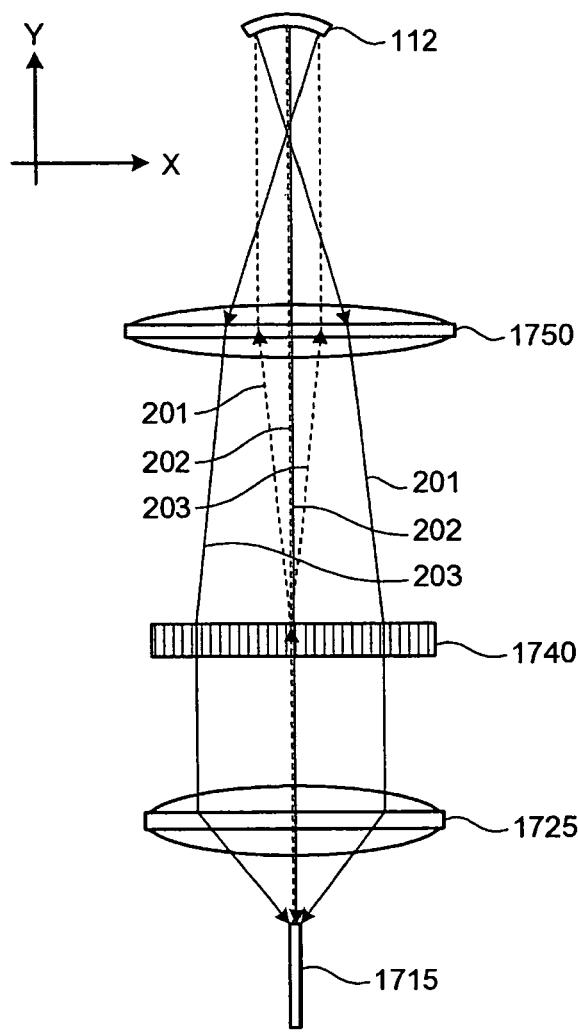
FIG. 11A is a schematic illustrating the curvature setting when the curvature radius is small.
Figure 11B:
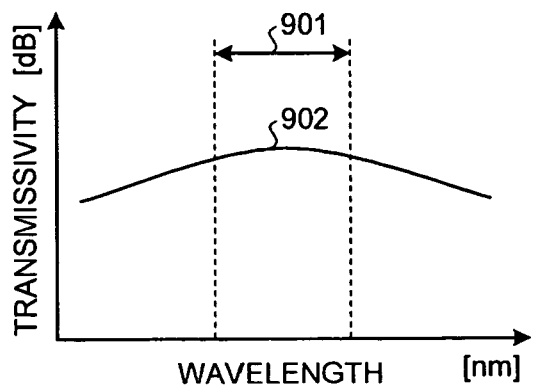
FIG. 11B is a graph indicating a transmission band characteristic of the optical switch shown in FIG. 11A.

FIG. 11A is a schematic illustrating curvature setting when the curvature radius is small. FIG. 11B is a graph indicating a transmission band characteristic of the optical switch 100 shown in FIG. 11A. FIG. 11A shows a configuration of the optical switch 100 when the curvature radius of the reflective surface of the mirror 112 is small, and the mirror 112 is not rotated.

In this case, as shown in FIG. 11A, the optical signals 201, 202, and 203 of the channel 20 are reflected by the mirror 112 at largely different angles, and converged to different points on the dispersing unit 1740 by the converging lens 1750, respectively. As a result, the optical signals 201, 202, and 203 are input to the port 1715 at largely different angles by the collimating lens 1725, respectively.

Since large coupling loss occurs for the optical signals 201 and 203, the range 901 within which transmissivity is equal to or greater than 0.5 dB becomes far narrower than the range 901 shown in FIG. 9B.

Thus, although a slope of the transmission band characteristic can be compensated by a curvature of the reflective surface, this comes at the expense of a narrowing of the range 901. Therefore, as attenuation is a function of rotation of the mirrors 111, 112, 113, and 114 about the Z-axis, the range of attenuation corresponds with the range of rotation and hence, the curvature radius of the reflective surface of each mirror 111, 112, 113, and 114 is set such that the smallest range 901 occurring within the attenuation range becomes as wide as possible.

The curvature of the reflective surface can be obtained by using a difference of linear expansion coefficient between the reflective surface material and the substrate material. In this case, a desired curvature at an operating temperature can be obtained by adjusting a deposit temperature of the reflective surface material or a deposit film pressure.

Figure 12A:
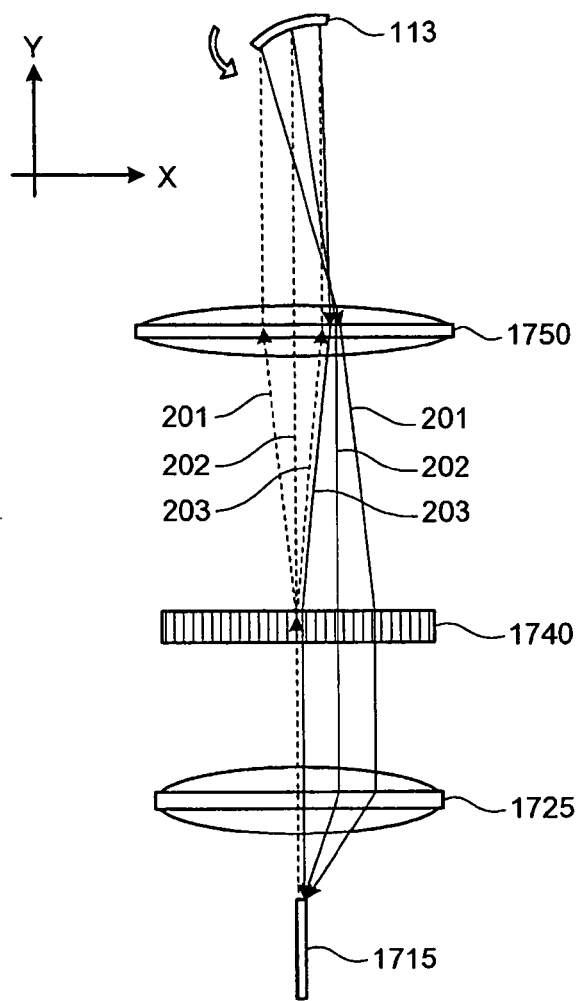
FIG. 12A is a schematic illustrating the curvature setting of the mirror for each channel when the curvature radius is large.
Figure 12B:
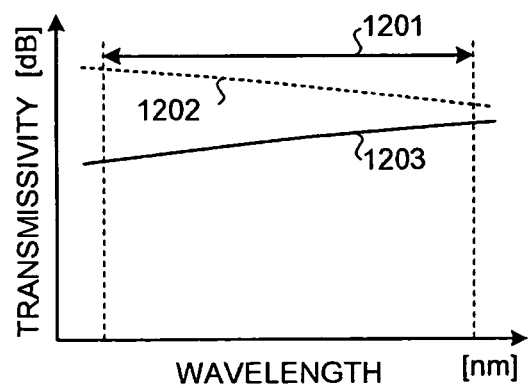
FIG. 12B is a graph indicating a transmission band characteristic of the optical switch shown in FIG. 12A.

FIG. 12A is a schematic illustrating curvature setting of the mirror for each channel when the curvature radius is large. FIG. 12B is a graph indicating a transmission band characteristic of the optical switch 100 shown in FIG. 12A. Only a channel 30 is shown in FIG. 12A. A reference numeral 1201 shown in FIG. 12B indicates a range of wavelengths included in the channel 30.

When the rotation angle of the mirror 110 about the Z-axis is limited, curvature about the X-axis of the reflective surface of each mirror can be different depending on the position on the converging lens 1750 through which each optical signal passes. For example, the curvature is set smaller as the each optical signal passes through a point farther from the center of the converging lens 1750.

Since the slope of the transmission band characteristic 1202 of the channel 30 is gradually downwards as shown in FIG. 12B, the curvature radius of the reflective surface of the mirror 113 corresponding to the channel 30 is set large as shown in FIG. 12A. As a result, the gradual upward slope of the transmission band characteristic 1202 of the channel 30 can be compensated by a compensation level of the transmission band characteristic 1203 having a gradual upward slope. For example, the curvature of each mirror can be changed by changing the deposition amount of the reflective surface material.

Figure 13A:
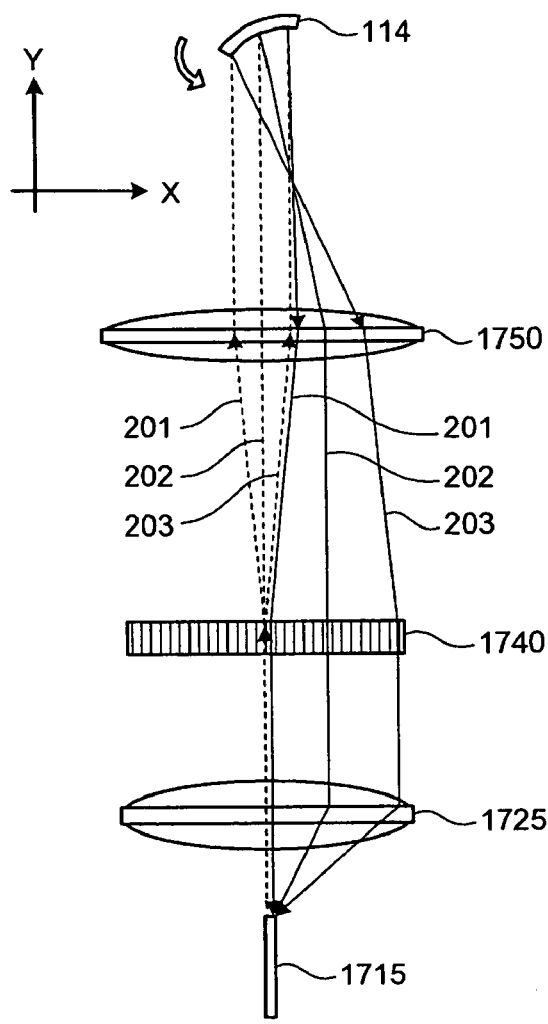
FIG. 13A is a schematic illustrating the curvature setting of the mirror for each channel when the curvature radius is small.
Figure 13B:
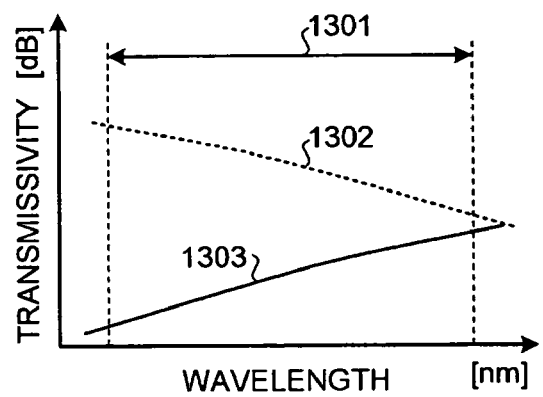
FIG. 13B is a graph indicating a transmission band characteristic of the optical switch shown in FIG. 13A.

FIG. 13A is a schematic illustrating curvature setting of the mirror for each channel when the curvature radius is small. FIG. 13B is a graph indicating a transmission band characteristic of the optical switch 100 shown in FIG. 13A. Only a channel 40 is shown in FIG. 13A. A reference numeral 1301 shown in FIG. 13B indicates a range of wavelengths included in the channel 40.

Since the slope of the transmission band characteristic 1302 of the channel 40 is steeply downwards as shown in FIG. 13B, the curvature radius of the reflective surface of the mirror 114 corresponding to the channel 40 is set small. As a result, the steep downwards slope of the transmission band characteristic 1302 of the channel 40 can be compensated by a compensation level of the transmission band characteristic 1303 having a steep upward slope.

Figure 14:
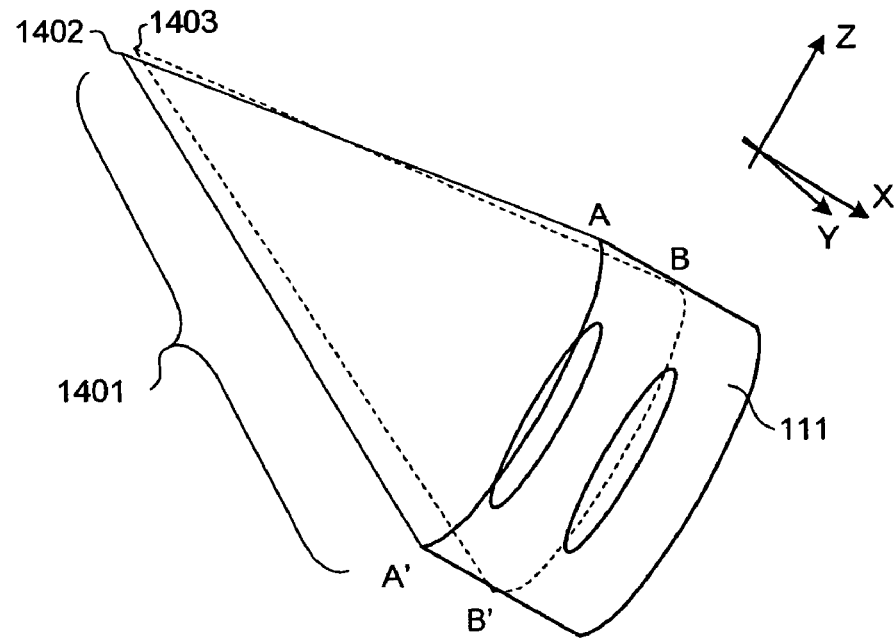
FIG. 14 is a first schematic illustrating effect of variation of a mirror curvature about a Z-axis on the transmission band characteristic.

FIG. 14 is a first schematic illustrating the effect of variation of the mirror curvature about the Z-axis on the transmission band characteristic. Only the mirror 111 is shown in FIG. 14. A reference numeral 1401 indicates a curvature radius of the mirror 111. A reference numeral 1402 indicates a point to which optical signals reflected between A-A' of the mirror 111 are converged. A reference numeral 1403 indicates a point to which optical signals reflected between B-B' of the mirror 111 are converged. When the curvature of the mirror 111 about the Z-axis differs between the A-A' and the B-B', a difference between the point 1402 and the point 1403 occurs.

Figure 15:
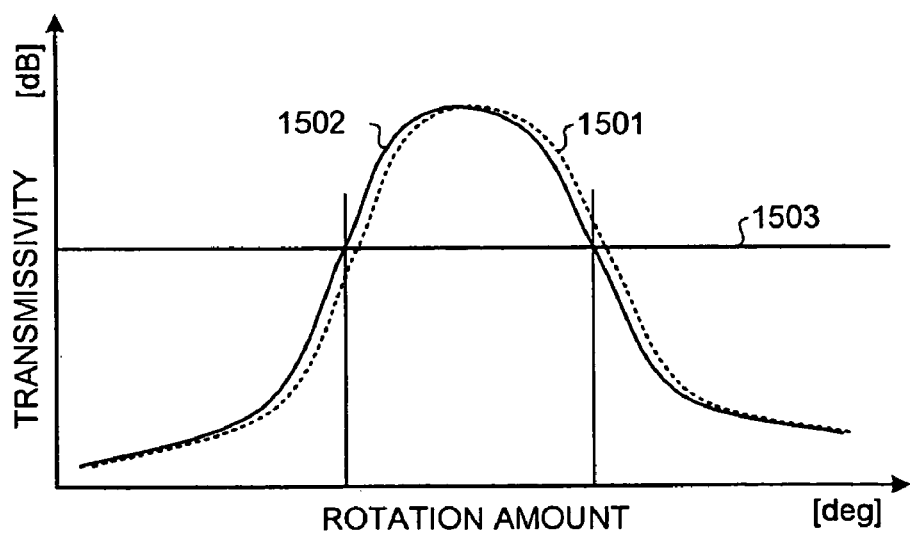
FIG. 15 is a second schematic illustrating effect of variation of a mirror curvature about the Z-axis on the transmission band characteristic.

FIG. 15 is a second schematic illustrating the effect of variation of the mirror curvature about the Z-axis on the transmission band characteristic. A horizontal axis indicates the degree of rotation of the mirror 111 about the X-axis. The vertical axis indicates a transmissivity of the optical switch 100. Reference numerals 1501 and 1502 indicate a transmission band characteristic of optical signals reflected at the A-A' and the B-B' of the mirror 111, respectively.

A reference numeral 1503 indicates a range of the degree of rotation within which the transmissivity of the optical signal reflected at the B-B' is equal to or greater than 0.5 dB. As shown in FIG. 15, when a difference between the points 1402 and 1403 occurs, a range of rotation angle for obtaining a desired transmissivity differs between the optical signals reflected at the A-A' and the B-B'.

In particular, when the curvature of the reflective surface of the mirror 111 is set large to switch the output port and limit the degree of rotation of the mirror 111 about the X-axis at the same time, the difference between the points 1402 and 1403 becomes large. Accordingly, the mirror 111 has to be made such that the curvature about the Z-axis between the A-A' and the B-B' does not vary.

The curvature about the Z-axis of the mirror 111 may be set small to reduce the difference between the points 1402 and 1403. More specifically, a rear surface of the mirror 111 may have anisotropic strength such as a rib, or anisotropic material may be bonded or vapor-deposited to the reflective surface along the Z-axis. For example, the mirror 111 may have a rib along the Z-axis so that the curvature about the Z-axis becomes smaller than that about the X-axis.

Figure 16:
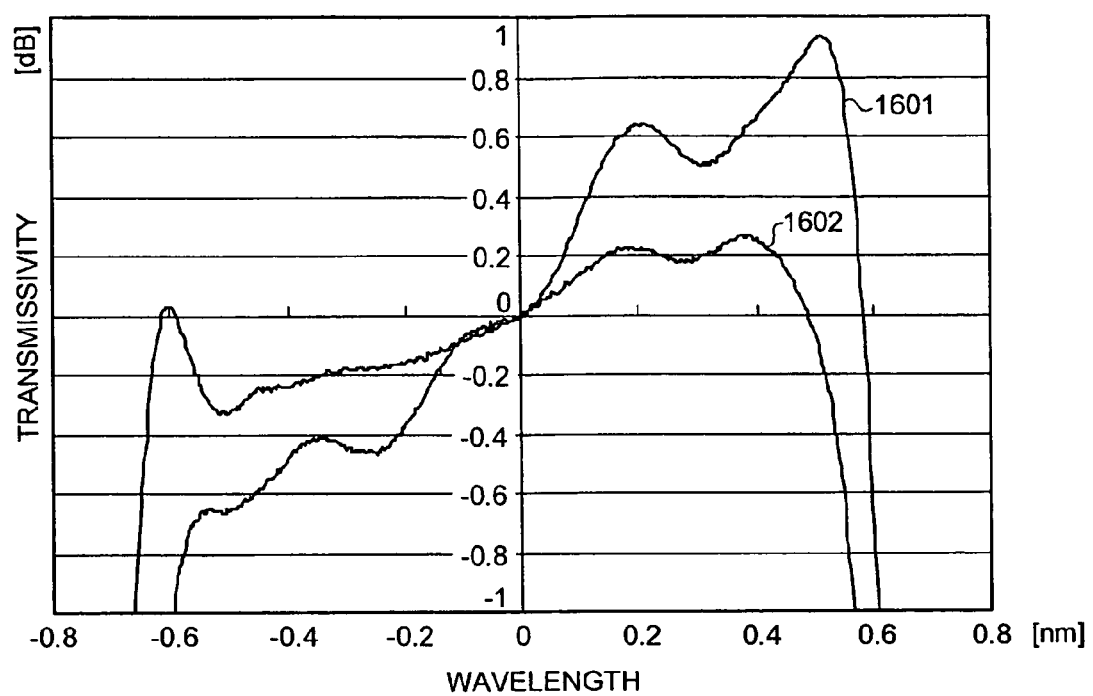
FIG. 16 is a graph indicating a result of a compensation of the transmission band characteristic performed by the optical switch.
Figure 17:
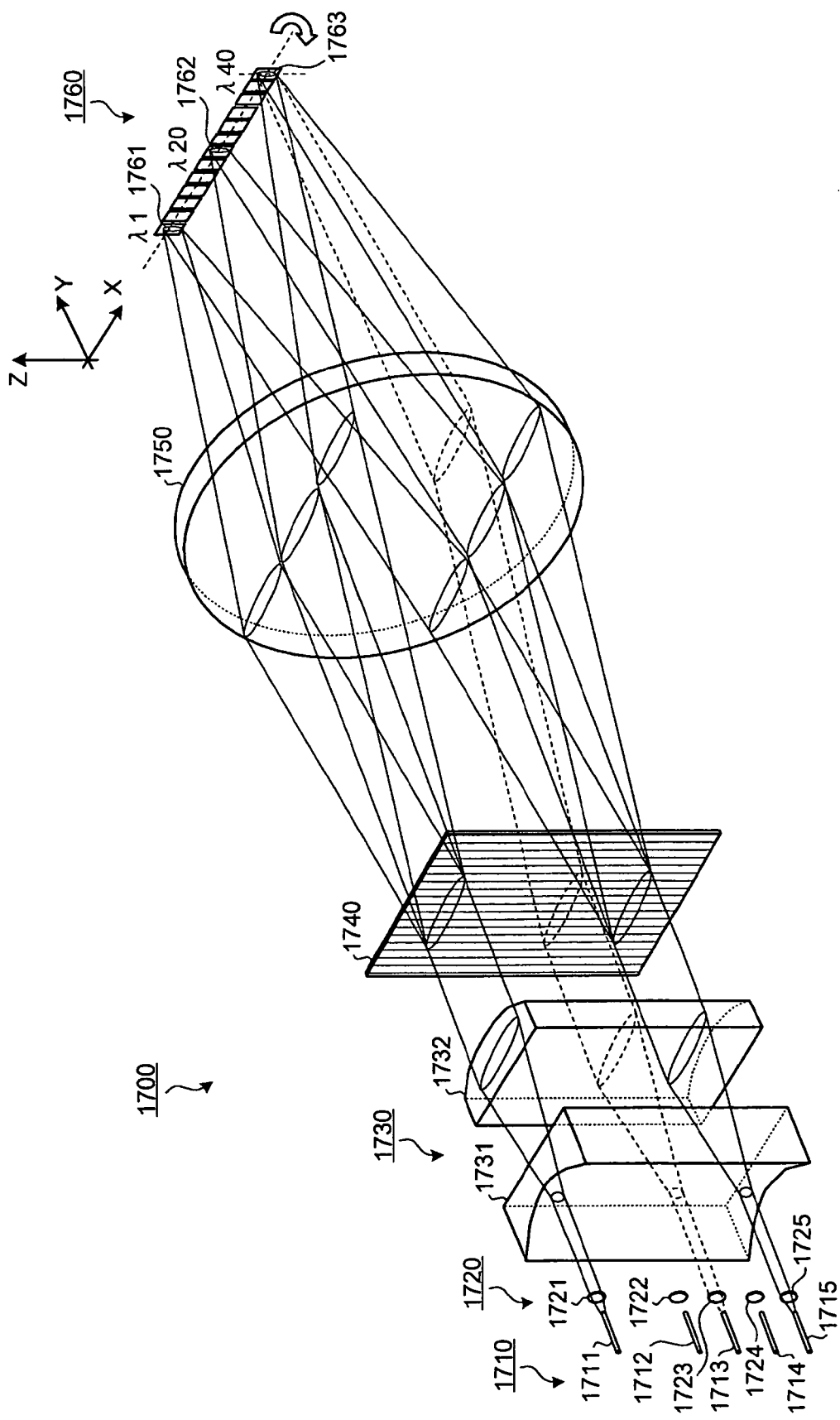
FIG. 17 is a schematic of a conventional optical switch.

FIG. 16 is a graph indicating a result of compensation of a transmission band characteristic performed by the optical switch 100. A reference numeral 1601 indicates a transmission band characteristic before the compensation when the level of attenuation performed by the optical switch 100 is 20 dB. A reference numeral 1602 indicates a transmission band characteristic after the compensation when the level of attenuation performed by the optical switch 100 is 20 dB.

The mirror unit 110 has been rotated about the Z-axis by 0.2 degrees herein. A diffraction grating having the frequency of 1000 lines/millimeter (mm) as the dispersing unit 1740, and a lens having a focal length of 100 mm as the converging lens 1750 have been used. The slope of the transmission band characteristic has been reduced from 1.33 db/nm before the compensation to 0.33 dB/nm after the compensation.

Though it is explained in the above embodiment that the optical switch 100 includes the converging lens 1750 that is convex, the present invention can be applied to a case where the converging lens is concave.

Furthermore, it is explained in the above embodiment that the curvature of the reflective surface and the reflection angle about the X-axis of the mirror unit 110 are set, for each mirror, according to the point on the converging lens 1750 through which an optical signal having a corresponding wavelength passes. However, the transmission band characteristic varies due to various factors at the time of actual design. Therefore, the curvature and the reflection angle may be adjusted by monitoring the transmission band characteristic to compensate the slope.

Furthermore, though it is explained in the above embodiment that the port 1711 is an input port and the ports 1712 to 1715 are output ports, each of the ports 1711 to 1715 may be either an input port or an output port. For example, the port 1711 may be used as an output port, and the ports 1712 to 1715 may be used as input ports.

In this case, the optical switch 100 outputs, from among optical signals input from the ports 1712 to 1715, an optical signal selected according to a wavelength to the port 1711. Furthermore, the optical switch 100 can be applied to various optical transmission apparatuses in an optical transmission system.

Furthermore, a monitor to monitor the optical signals output from the port unit 1710 can be provided. In the case, the monitor monitors a transmissivity of the optical signal output from the port unit 1710, and the control unit controls the driving unit so that the transmissivity becomes constant for each wavelength. Furthermore, the monitoring may be periodically performed by the monitor to compensate a slope of a transmission band characteristic caused by a change in temperature and deterioration of an optical system that occur over time.

As explained above, according to the embodiment, a slope of a transmission band characteristic for each channel can be compensated without a compensating lens. Furthermore, the slope can be compensated and a desired transmissivity can be maintained at the same time.

Though it is explained in the above embodiment that the plural mirrors correspond to wavelengths of optical signals, the mirrors do not have to perfectly correspond to the wavelengths, and may be arrayed in the dispersing direction of the dispersing element. Furthermore, though it is also explained in the above embodiment that the output ports correspond to reflection angles of the mirrors, the output ports do not have to perfectly correspond to the reflection angles, and may be arranged at positions to which the optical signals output from the dispersing element are input.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical switch comprising:
   an input port from which a multiplexed optical signal is input;
   a dispersing unit that disperses the multiplexed optical signal into a plurality of optical signals;
   a converging unit that converges the dispersed optical signals;
   a plurality of mirrors that reflect the converged optical signals, respectively; and
   a plurality of output ports through which the reflected optical signals are output, respectively, wherein
   each of the mirrors rotates about a first axis and a second axis to change a first reflection angle and a second reflection angle thereof, respectively, and has a concave reflective surface having a predetermined curvature about the second axis about which each of the mirrors rotates for switching between the output ports, and
   the optical switch further comprises a control unit that controls the first reflection angle of each of the mirrors such that transmissivities of wavelengths included in each of the optical signals output from the output ports become substantially the same, and controls the second reflection angle of each of the mirrors such that a transmissivity of each of the optical signals output from the output ports becomes a desired level.

2. The optical switch according to claim 1, wherein the first reflection angle varies according to a point on the converging unit through which the dispersed optical signals pass respectively.

3. The optical switch according to claim 1, wherein the predetermined curvature differs according to a point on the converging unit through which the dispersed optical signals pass respectively.

4. The optical switch according to claim 1, wherein the second reflection angle differs according to the predetermined curvature.

5. The optical switch according to claim 1, wherein the second reflection angle varies according to the first reflection angle.

6. The optical switch according to claim 1, wherein each of the mirrors has a curvature about the second axis that is larger than the predetermined curvature.

7. The optical switch according to claim 6, wherein each of the mirrors includes a rib along the first axis.

8. The optical switch according to claim 1, further comprising
   a monitoring unit that monitors the transmissivities, wherein
   the control unit controls the first reflection angle based on the transmissivities.

9. The optical switch according to claim 1, wherein the converging unit is a transmissive convex lens.

10. The optical switch according to claim 1, wherein the converging unit is a reflective concave mirror.

11. A method of adjusting an optical switch that includes a dispersing unit that disperses an input multiplexed optical signal into a plurality of optical signals and a plurality of mirrors that reflect the optical signals to a plurality of output ports, respectively, wherein each of the mirrors rotates about a first axis and a second axis to change a first reflection angle and a second reflection angle thereof, respectively, and has a concave reflective surface having a predetermined curvature about the second axis about which each of the mirrors rotates for switching between the output ports, the method comprising:
   first-adjusting the predetermined curvature and the first reflection angle of each of the mirrors such that transmissivities of wavelengths included in each of the optical signals output from the output ports become substantially the same; and
   second-adjusting the second reflection angle of each of the mirrors such that a transmissivity of each of the optical signals output from the output ports becomes a desired level.

* * * * *